(12) United States Patent
You et al.

(10) Patent No.: US 8,171,376 B2
(45) Date of Patent: May 1, 2012

(54) METHOD FOR PROTECTING IMPORTANT DATA OF CONTENTS AND APPARATUS THEREFOR

(75) Inventors: Yong-kuk You, Seoul (KR); Choong-hoon Lee, Seoul (KR); Seong-soo Kim, Seoul (KR); Chang-yeul Kwon, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1116 days.

(21) Appl. No.: 12/029,028

(22) Filed: Feb. 11, 2008

(65) Prior Publication Data

US 2008/0196105 A1 Aug. 14, 2008

Related U.S. Application Data

(60) Provisional application No. 60/901,111, filed on Feb. 14, 2007.

(30) Foreign Application Priority Data

Apr. 30, 2007 (KR) .................... 10-2007-0042109

(51) Int. Cl.
*H03M 13/00* (2006.01)
*G06F 11/00* (2006.01)

(52) U.S. Cl. ........................................ 714/761; 714/746
(58) Field of Classification Search .................. 714/48, 714/746, 779, 761–762, 787–788; 713/176, 713/182, 194; 726/25–26
See application file for complete search history.

(56) References Cited

U.S. PATENT DOCUMENTS

| 6,611,534 | B1 * | 8/2003 | Sogabe et al. | 370/471 |
| 7,571,368 | B1 * | 8/2009 | Bruner et al. | 714/746 |
| 2007/0250851 | A1 * | 10/2007 | Lev | 725/25 |

OTHER PUBLICATIONS

Lee et al., Designated Verification of digital watermark for network based image distribution, 2003, ACM digital library, p. 1069 to 1078.*

* cited by examiner

*Primary Examiner* — Shelly A Chase
(74) *Attorney, Agent, or Firm* — Sughrue Mion, PLLC

(57) ABSTRACT

A method of protecting important data in digital content and an apparatus therefor are provided. The method includes: receiving digital content which includes first important data; receiving reference data which includes second important data and authentication data for verifying whether the first important data is modified; and selectively correcting the first important data included in the digital content based on the reference data.

23 Claims, 3 Drawing Sheets

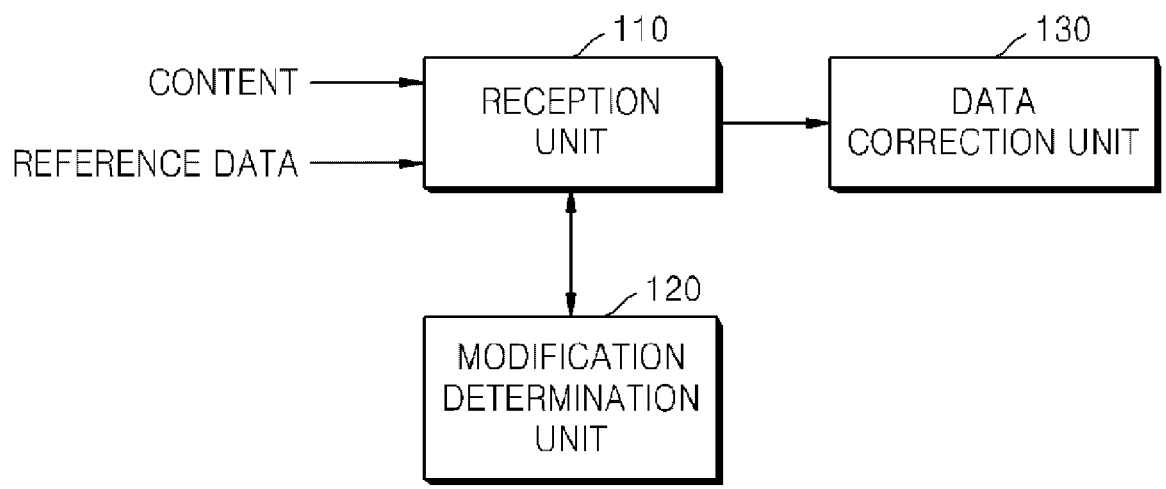

| EMI | EMBEDDED CCI FOR EACH PROGRAM | | | | |
|---|---|---|---|---|---|
| | 00 | | 01 | 10 | 11 |
| | EPN-NOT-ASSERTED | EPN-ASSERTED | | | |
| MODE A | ALLOWED | ALLOWED | ALLOWED | ALLOWED | ALLOWED |
| MODE B | ALLOWED | ALLOWED | PROHIBITED | ALLOWED | PROHIBITED |
| MODE C | ALLOWED | ALLOWED | ALLOWED | ALLOWED | PROHIBITED |
| N.A. | ALLOWED | PROHIBITED | PROHIBITED | PROHIBITED | PROHIBITED |

METHOD FOR PROTECTING IMPORTANT DATA OF CONTENTS AND APPARATUS THEREFOR

CROSS-REFERENCE TO RELATED PATENT APPLICATIONS

This application claims priority from Korean Patent Application No. 10-2007-0042109, filed on Apr. 30, 2007 in the Korean Intellectual Property Office, and U.S. Provisional Patent Application No. 60/901,111, filed on Feb. 14, 2007 in the U.S. Patent and Trademark Office, the disclosures of which are incorporated herein in their entirety by reference.

BACKGROUND OF THE INVENTION

1. Field of the Invention

Methods and apparatuses consistent with the present invention relate to protecting important data in digital content.

2. Description of the Related Art

As demands for transmitting and receiving non-compressed video and/or audio content through wireless communication systems with a transmission rate of several Gbps by using a bandwidth of tens of GHz (for example, 4 Gbps at 60 GHz) have been increasing recently, related technology developments have been actively performed.

Since the size of the non-compressed video and/or audio content is very large, even when an error occurs in the digital content being received, the digital content cannot be continuously received again until the error is corrected. That is, if an error occurs in the received digital content, the digital content is received again a predetermined number of times, and even though the digital content is received again the predetermined number of times, if the error still exists in the received digital content, the received digital content has to be used with the error existing in part of the digital content.

In this case, if the error exists in important data among data included in the digital content, it causes a problem. For example, when copy control information (CCI) is inserted into the digital content, if an error occurs in the CCI, the digital content itself including the CCI may not be used.

However, there has been no method of effectively protecting important data, included in digital content, by preventing occurrence of an error in the data, when a large amount of digital content is transmitted according to conventional technology.

SUMMARY OF THE INVENTION

The present invention provides a method of protecting important data in digital content, by which important data included in digital content can be effectively protected, and an apparatus therefor.

According to an aspect of the present invention, there is provided a method of protecting important data in digital content including: receiving digital content in which important data is inserted; receiving reference data in which the important data and authentication data for verifying whether the important data is modified are combined; and selectively correcting the important data inserted into the received digital content based on the received reference data.

The reference data may be received by using a channel more stable than a channel through which the digital content is received.

The method may further include determining whether the important data included in the reference data is modified, wherein in the receiving of the reference data the reference data is repeatedly received until it is determined that the received important data is not modified.

The determining of whether the important data included in the reference data is modified may include: separating the important data included in the reference data and the authentication data; generating authentication data in relation to the separated important data; and comparing the generated authentication data with the separated authentication data, and based on the comparison result, determining whether the important data is modified.

The selective correcting of the important data may include: comparing the important data inserted into the digital content with the important data included in the reference data; and based on the comparison result, selectively correcting the important data inserted into the digital content.

In the selective correcting of the important data, if the comparison result indicates that the important data inserted into the digital content does not match with the important data included in the reference data, the important data inserted into the digital content may be corrected according to the important data included in the reference data.

In the selective correcting of the important data, the correction may be performed by replacing the important data inserted into the digital content with the important data included in the reference data.

In the selective correcting of the important data, the correction may be performed, by correcting data in the important data inserted into the digital content, having a value different from that of the data in the important data included in the reference data, according to the important data included in the reference data.

The authentication data may be formed by a message authentication code which is a hash value in relation to the important data generated by using a predetermined shared key.

The authentication data may be formed by an electronic signature generated by using a secret key of an apparatus which transmits the digital content into which the important data is inserted.

The important data may be copy control information in relation to the digital content.

According to another aspect of the present invention, there is provided an apparatus for protecting important data in digital content including: a reception unit receiving digital content in which important data is inserted, and reference data in which the important data and authentication data for verifying whether the important data is modified are combined; and a data correction unit selectively correcting the important data inserted into the received digital content based on the reference data received by the reception unit.

The apparatus may further include a modification determination unit determining whether the important data included in the reference data received by the reception unit is modified, wherein the reception unit repeatedly receives the reference data until it is determined that the received important data is not modified.

The modification determination unit may include: a separation unit separating the important data included in the reference data received by the reception unit and the authentication data; an authentication data generation unit generating authentication data in relation to the important data generated by the separation unit; and a comparison determination unit comparing the authentication data generated in the authentication data generation unit with the separated authentication data, and based on the comparison result, determining whether the important data is modified.

The data correction unit may include: a comparison unit comparing the important data inserted into the digital content with the important data included in the reference data; and a correction unit selectively correcting the important data inserted into the digital content based on the comparison result.

According to still another aspect of the present invention, there is provided a computer readable recording medium having embodied thereon a computer program for executing a method, wherein the method comprises: receiving digital content in which important data is inserted; receiving reference data in which the important data and authentication data for verifying whether the important data is modified are combined; and selectively correcting the important data inserted into the received digital content based on the received reference data.

BRIEF DESCRIPTION OF THE DRAWINGS

The above and other aspects of the present invention will become more apparent by describing in detail exemplary embodiments thereof with reference to the attached drawings in which:

FIG. 1 is a diagram illustrating an apparatus for protecting important data in digital content according to an exemplary embodiment of the present invention;

FIG. 2 is a diagram illustrating an encryption mode indicator (EMI) in data transmission content protection (DTCP) according to an exemplary embodiment of the present invention;

DETAILED DESCRIPTION OF THE INVENTION

The present invention will now be described more fully with reference to the accompanying drawings, in which exemplary embodiments of the invention are shown.

FIG. 1 is a diagram illustrating an apparatus for protecting important data in digital content according to an exemplary embodiment of the present invention. The apparatus for protecting important data in digital content includes a reception unit 110, a modification determination unit 120, and a data correction unit 130.

The reception unit 110 receives digital content in which important data is inserted, and reference data in which the important data and authentication data for verifying whether the important data is modified are combined.

In this case, the authentication data may be formed as a message authentication code which is a hash value in relation to the important data generated by using a predetermined shared key.

Here, the predetermined shared key is a key which is shared by the transmission apparatus transmitting the data and the apparatus for protecting important data according to the current exemplary embodiment.

Also, the authentication data may be formed by an electronic signature generated by using a secret key of the transmission apparatus.

In the exemplary embodiment, the reference data may be received through a channel which is separate from and more stable than a channel through which the digital content is received. In this way, by receiving the reference data through the separate channel which is more stable than the channel through which the digital content is received, the probability that the reference data is modified or changed by an error can be reduced.

Also, in this case, the more stable channel may indicate a channel which is set up so that a third party having an intention of modification cannot easily access the channel, a channel having a low error ratio in relation to transmitting data.

The important data indicates data containing important information which requires protection from modification or errors. Hereinafter, as examples of important data, an encryption mode indicator (EMI) which is CCI in data transmission content protection (DTCP), and embedded CCI will be explained.

FIG. 2 is a diagram illustrating an EMI in DTCP according to an exemplary embodiment of the present invention.

Referring to FIG. 2, an EMI is two-bit copy control information expressed in the header of a data packet and can have four modes, i.e., Mode A, Mode B, Mode C and N.A. Copy control information such as copy-never, copy-one-generation, no-more-copies, and copy free, is set in respective modes. Here, the mode N.A., which means copy-free, indicates 'not applicable'.

Figures 3, 4:
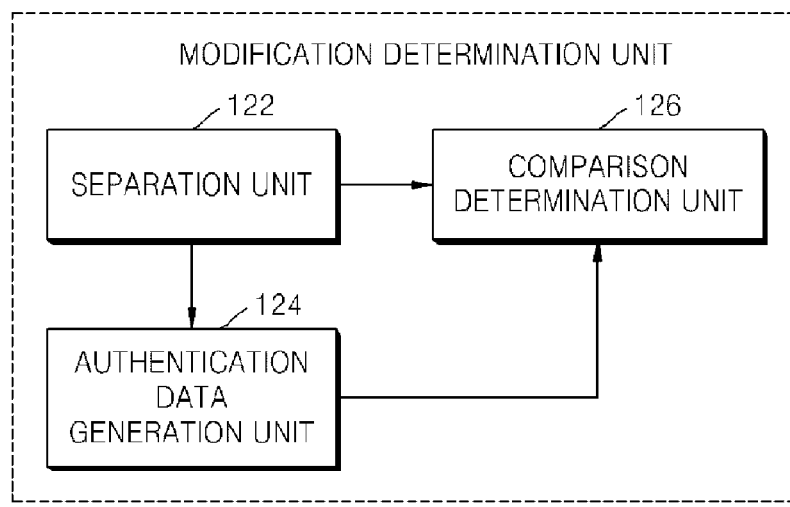
FIG. 3 is a diagram illustrating the relationship between an EMI in DTCP and embedded CCI according to an exemplary embodiment of the present invention.
FIG. 4 is a diagram illustrating a modification determination unit according to an exemplary embodiment of the present invention.

FIG. 3 is a diagram illustrating the relationship between an EMI in DTCP and embedded CCI according to an exemplary embodiment of the present invention.

FIG. 3 shows the relationship between an EMI and an embedded CCI inserted into a data packet which is transmitted by using DTCP. EPN-ASSERTED, i.e., encryption plus non-assertion, indicates a mode in which copying is not limited and encryption is performed, while EPN-NOT-ASSERTED indicates a mode in which copying is not limited and encryption is not performed.

Referring to FIG. 3, allowed combinations and prohibited combinations of EMI modes and embedded CCI modes can be known. For example, a case where the EMI mode is set to mode B allowing copy-one-generation and the embedded CCI mode is set to mode 01 indicating no-more-copies is a prohibited combination. That is, when the EMI mode and the embedded CCI mode indicate copy control information modes contradictory to each other, one of the EMI mode and the embedded CCI mode is regarded as modified by a third party, and therefore this combination is prohibited.

However, processing of the prohibited combinations may vary with respect to predetermined rules. When necessary, a rule may be determined so that if a prohibited combination occurs, data itself, including the EMI and the embedded CCI, cannot be used.

Thus, depending on embodiments, when the embedded CCI inserted into digital content is modified by a third party, or changed to a different value by an error, thereby generating a prohibited combination of the EMI mode and the embedded CCI mode, data itself, including the EMI and the embedded CCI, cannot be used.

Accordingly, in order to prevent this problem, the present invention provides a method of protecting important data.

The modification determination unit 120 determines whether important data included in reference data received by the reception unit 110 is modified.

In the current exemplary embodiment, the term "modification" has a meaning broader than its ordinary meaning which is manipulation of data by a third party, and also includes a case where data has a different value by an error from an original value that the data has.

FIG. 4 is a diagram illustrating a modification determination unit according to an exemplary embodiment of the present invention.

Referring to FIG. 4, the modification determination unit according to the current exemplary embodiment includes a separation unit 122, an authentication data generation unit 124, and a comparison determination unit 126.

The separation unit 122 separates important data and authentication data included in reference data received by the reception unit 110.

The authentication data generation unit 124 generates authentication data in relation to the important data separated by the separation unit 122.

In this case, if the authentication data included in the received reference data is generated by using a predetermined shared key, the authentication data generation unit 124 generates authentication data by using the shared key. As described above, the shared key is a key which is shared by the apparatus which transmits the reference data, and the apparatus for protecting important data according to the present invention.

The comparison determination unit 126 compares the authentication data generated in the authentication data generation unit 124 with the authentication data separated in the separation unit 122, and determines whether the important data is modified based on the comparison result.

That is, if the comparison result indicates that the authentication data generated in the authentication data generation unit 124 matches the authentication data separated in the separation unit 122, the comparison determination unit 126 determines that the important data is not modified.

In this case, the reception unit 110 repeatedly receives reference data until it is determined according to the determination result of the modification determination unit 120 that the important data is not modified.

However, depending on various implementations, the modification determination unit 120 may be omitted. For example, when the important data included in the received reference data is not modified can be confirmed according to another method, the process by the modification determination unit 120 of determining whether the important data is modified can be omitted.

The data correction unit 130 selectively corrects the important data inserted into the received digital content, based on the reference data received by the reception unit 110.

In this case, only when it is determined according to the determination result of the modification determination unit 120 that the important data included in the received reference data is not modified, correction of the important data inserted into the digital content is performed.

The data correction unit 130 may be performed correction by replacing the important data inserted into the digital content with the important data included in the reference data. For example, the data correction unit 130 may perform correction, by copying the important data included in the reference data, and overwriting the copied important data on the important data inserted into the digital content.

Also, the data correction unit 130 may perform correction, by correcting data in the important data inserted into the digital content, having a value different from that of the data in the important data included in the reference data, according to the important data included in the reference data. That is, in this case, only part of the important data inserted into the digital content is corrected.

Figure 5:
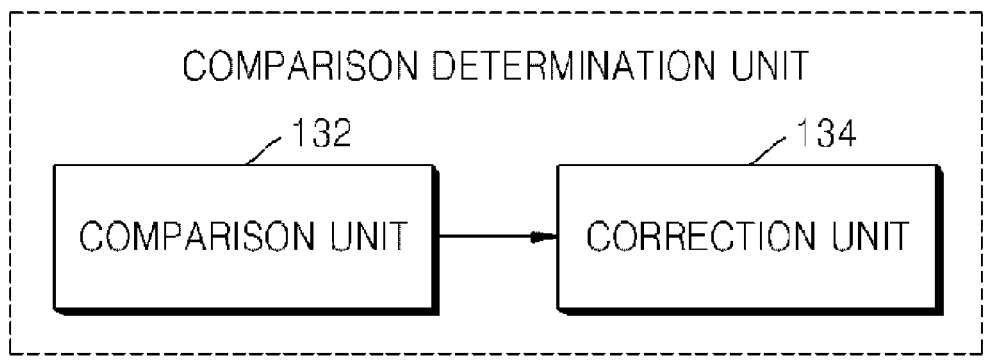
FIG. 5 is a diagram illustrating a data correction unit according to an exemplary embodiment of the present invention.

FIG. 5 is a diagram illustrating a data correction unit according to an exemplary embodiment of the present invention.

Referring to FIG. 5, the data correction unit according to the current exemplary embodiment includes a comparison unit 132 and a correction unit 134.

The comparison unit 132 compares important data inserted into digital content and important data included in reference data.

The correction unit 134 selectively corrects the important data inserted into the digital content based on the comparison result of the comparison unit 132.

That is, when the comparison result of the comparison unit 132 indicates that the important data inserted into the digital content does not match (differs from) the important data included in the reference data, the correction unit 134 corrects the important data inserted into the digital content, according to the important data included in the reference data.

Thus, according to the present invention, even when it is determined that the important data inserted into the digital content received by the reception unit 110 is modified or is changed to a different value by an error, the important data inserted into the digital content is corrected by using the important data included in the reference data. In this way, the original value of the important data inserted into the digital content is made to be always maintained, thereby providing an effect of protecting the important data.

Figure 6:
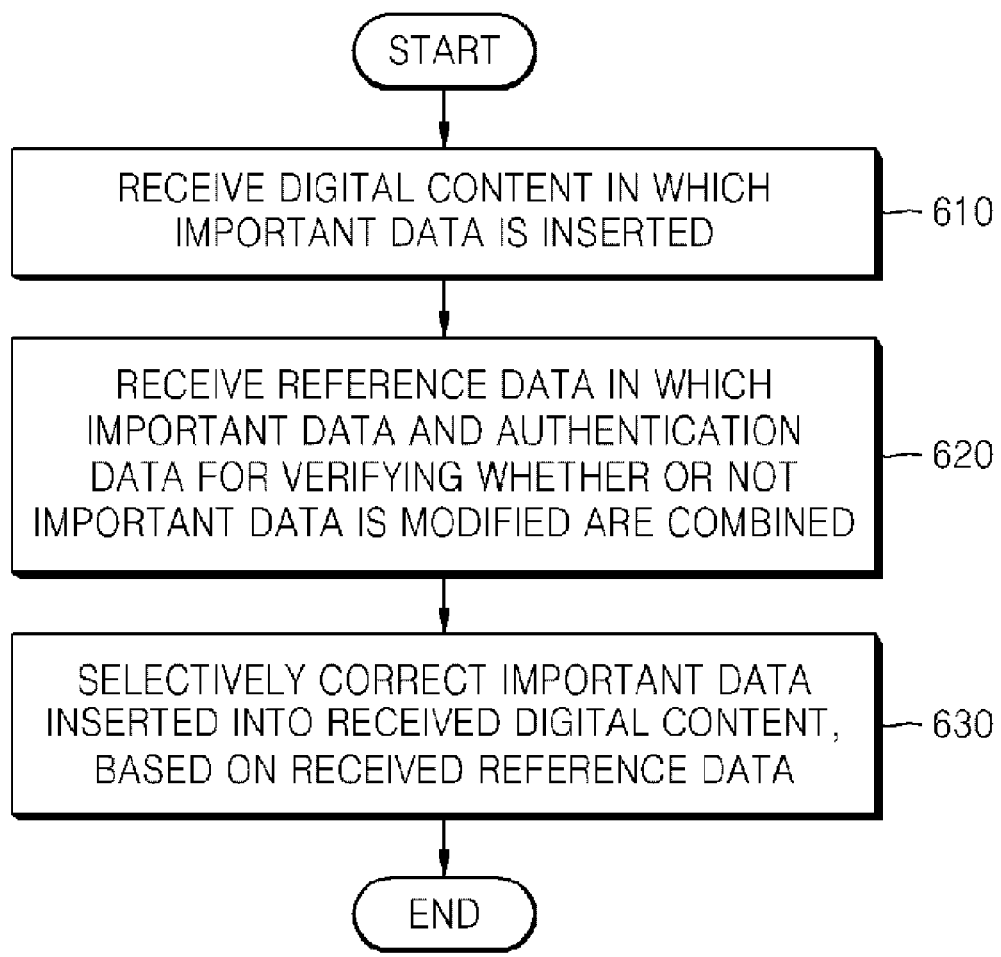
FIG. 6 is a flowchart illustrating a method of protecting important data in digital content according to an exemplary embodiment of the present invention.

FIG. 6 is a flowchart illustrating a method of protecting important data in digital content according to an exemplary embodiment of the present invention.

In operation 610, digital content into which important data is inserted is received.

In operation 620, reference data in which important data and authentication data for verifying whether the important data is modified are combined, is received.

As described above, in this case, the reference data may be received by using a separate channel more stable than a channel through which the digital content is received.

In this case, depending on various implementations, an operation for determining whether the important data included in the received reference data is modified may be further included.

In operation 630, based on the received reference data, the important data inserted into the received digital content is selectively corrected.

According to the present invention as described above, digital content in which important data is inserted is received, and reference data in which the important data and authentication data for verifying whether the important data is modified are combined is received. Then, the important data inserted into the received digital content is selectively corrected based on the received reference data, thereby effectively protecting the important data included in the digital content.

The present invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices.

While the present invention has been particularly shown and described with reference to exemplary embodiments thereof, it will be understood by those of ordinary skill in the art that various changes in form and details may be made therein without departing from the spirit and scope of the present invention as defined by the following claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method of protecting important data in digital content, the method comprising:
   receiving digital content which includes first important data;
   receiving reference data which includes second important data and authentication data for verifying whether the first important data is modified; and
   selectively correcting the first important data included in the digital content based on the reference data.

2. The method of claim 1, wherein the reference data is received through a channel which is different than a channel through which the digital content is received.

3. The method of claim 1, further comprising determining whether the second important data included in the reference data is modified,
   wherein the receiving the reference data is repeated until it is determined that the second important data is not modified.

4. The method of claim 1, wherein the determining whether the second important data included in the reference data is modified comprises:
   generating authentication data in relation to the second important data; and
   comparing the generated authentication data with the separated authentication data, and based on a result of the comparing, determining whether the second important data is modified.

5. The method of claim 1, wherein the selectively correcting the important data comprises:
   comparing the first important data inserted into the digital content with the second important data included in the reference data; and
   based on a result of the comparing, selectively correcting the first important data inserted into the digital content.

6. The method of claim 5, wherein in the selectively correcting the first important data, if the result of the comparing indicates that the first important data included in the digital content does not match the second important data included in the reference data, the first important data included in the digital content is corrected according to the second important data included in the reference data.

7. The method of claim 1, wherein the selectively correcting the first important data comprises replacing the first important data included the digital content with the second important data included in the reference data.

8. The method of claim 1, wherein the selectively correcting the first important data comprises correcting data of the first important data included in the digital content, having a value different from that of data of the second important data included in the reference data, according to the second important data included in the reference data.

9. The method of claim 1, wherein the authentication data is formed by a message authentication code which is a hash value in relation to the first and second important data generated by using a shared key.

10. The method of claim 1, wherein the authentication data is formed by an electronic signature generated by using a secret key of an apparatus which transmits the digital content.

11. The method of claim 1, wherein the first and second important data is copy control information in relation to the digital content.

12. An apparatus for protecting important data in digital content, the apparatus comprising:
    a reception unit which receives digital content which includes first important data, and reference data which includes second important data and authentication data for verifying whether the first important data is modified; and
    a data correction unit which selectively corrects the first important data included in the digital content based on the reference data received by the reception unit.

13. The apparatus of claim 12, wherein the reference data is received through a channel which is different than a channel through which the digital content is received.

14. The apparatus of claim 12, further comprising a modification determination unit which determines whether the second important data included in the reference data received by the reception unit is modified,
    wherein the reception unit repeatedly receives the reference data until it is determined that the second important data is not modified.

15. The apparatus of claim 12, wherein the modification determination unit comprises:
    a separation unit which separates the second important data and the authentication data included in the reference data received by the reception unit;
    an authentication data generation unit which generates authentication data in relation to the second important data separated by the separation unit; and
    a comparison determination unit which compares the authentication data generated in the authentication data generation unit with the authentication data separated by the separation unit, and based on a result of the comparison, determines whether the second important data is modified.

16. The apparatus of claim 12, wherein the data correction unit comprises:
    a comparison unit which compares the first important data included in the digital content with the second important data included in the reference data; and
    a correction unit which selectively corrects the first important data inserted into the digital content based on a result of the comparison by the comparison unit.

17. The apparatus of claim 16, wherein if the result of the comparison by the comparison unit indicates that the first important data included in the digital content does not match the second important data included in the reference data, the correction unit corrects the first important data included in the digital content according to the second important data included in the reference data.

18. The apparatus of claim 12, wherein the data correction unit performs correction, by replacing the first important data included in the digital content with the second important data included in the reference data.

19. The apparatus of claim 12, wherein the data correction unit performs correction, by correcting data of the first important data included in the digital content, having a value different from that of data of the important data included in the reference data, according to the second important data included in the reference data.

20. The apparatus of claim 12, wherein the authentication data is formed by a message authentication code which is a hash value in relation to the first and second important data generated by using a predetermined shared key.

21. The apparatus of claim 12, wherein the authentication data is formed by an electronic signature generated by using a secret key of an apparatus which transmits the digital content.

22. The apparatus of claim 12, wherein the first and second important data is copy control information in relation to the digital content.

23. A computer readable recording medium having embodied thereon a computer program for executing a method of protecting important data in digital content, the method comprising:

receiving digital content which includes first important data;

receiving reference data which includes second important data and authentication data for verifying whether the first important data is modified; and selectively correcting the first important data included in the received digital content based on the received reference data.

\* \* \* \* \*